United States Patent [19]
Nixon

[11] Patent Number: 5,542,488
[45] Date of Patent: Aug. 6, 1996

[54] ELECTRIC VEHICLE HAVING MULTIPLE REPLACEMENT BATTERIES

[76] Inventor: Dale B. Nixon, 3519 Brookline La., Farmers Branch, Tex. 75234

[21] Appl. No.: 358,814

[22] Filed: Dec. 19, 1994

Related U.S. Application Data

[63] Continuation of Ser. No. 45,523, Apr. 8, 1993, Pat. No. 5,373,910.

[51] Int. Cl.$^6$ .................................................... B60K 1/04
[52] U.S. Cl. ........................ 180/65.1; 180/68.5; 104/34
[58] Field of Search .............................. 180/65.1, 65.2, 180/65.3, 65.4, 65.8, 68.5; 414/392, 395; 104/34; 318/139

[56] References Cited

U.S. PATENT DOCUMENTS

| | | | |
|---|---|---|---|
| 3,122,244 | 2/1964 | Corso | 214/38 |
| 3,336,997 | 8/1967 | Yates et al. | 180/65 |
| 3,575,250 | 4/1971 | Dykes | 180/11 |
| 3,708,028 | 1/1973 | Hafer | 180/65 R |
| 4,042,054 | 8/1977 | Ward | 180/60 |
| 4,087,895 | 5/1978 | Etienne | 29/252 |
| 4,094,377 | 6/1978 | Biggs | 180/65.1 |
| 4,102,273 | 7/1978 | Merkle et al. | 104/34 |
| 4,216,839 | 8/1980 | Gould et al. | 180/68.5 |
| 4,229,688 | 10/1980 | Knox et al. | 320/48 |
| 4,258,816 | 3/1981 | Klink | 180/68.5 |
| 4,299,526 | 11/1981 | Smith | 414/392 |
| 4,334,819 | 6/1982 | Hammerslag | 414/395 |
| 4,362,220 | 12/1982 | Baston | 180/68.5 |
| 4,397,365 | 8/1983 | Harbe et al. | 180/68.5 |
| 4,435,486 | 3/1984 | Pomaro et al. | 429/1 |
| 4,450,400 | 5/1984 | Gwyn | 320/2 |
| 4,496,274 | 1/1985 | Pipes | 414/340 |
| 4,511,637 | 4/1985 | Evans | 429/100 |
| 4,689,531 | 8/1987 | Bacon | 318/139 |
| 4,991,674 | 2/1991 | Fullenkamp | 180/68.5 |
| 5,015,545 | 5/1991 | Brooks | 180/68.5 |
| 5,131,851 | 7/1992 | Billger et al. | 439/34 |
| 5,163,537 | 11/1992 | Radev | 187/9 R |
| 5,187,423 | 2/1993 | Marton | 320/2 |

*Primary Examiner*—Richard M. Camby

[57] ABSTRACT

A battery-powered vehicle has two batteries which are replaced, rather than recharged in the vehicle. The vehicle is powered by only one battery at a time and that battery is used until substantially all of the energy in the battery is exhausted. A discharged battery is replaced while the vehicle operates with the other, non-discharged battery. Preferred batteries have high energy density and may be of a type that is not rechargeable. An example is an aluminum-air battery. The non-rechargeable, discharged batteries can be remanufactured to produce new batteries for further use in the vehicle.

16 Claims, 2 Drawing Sheets

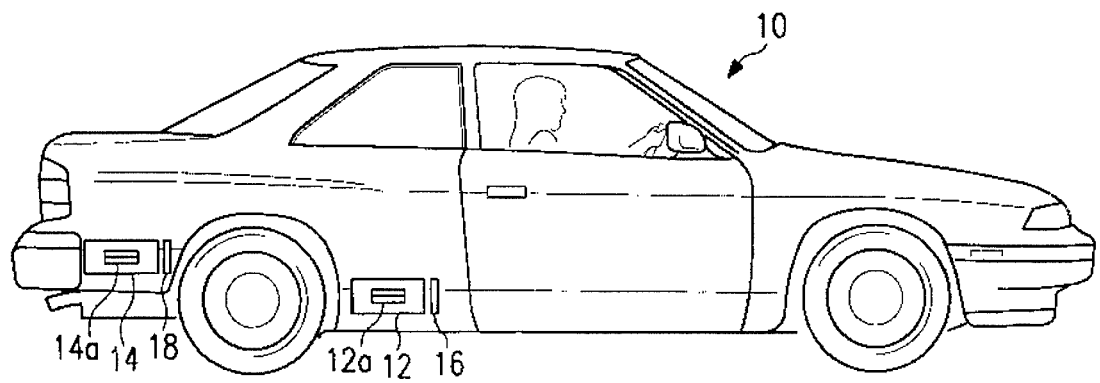
FIG. 1
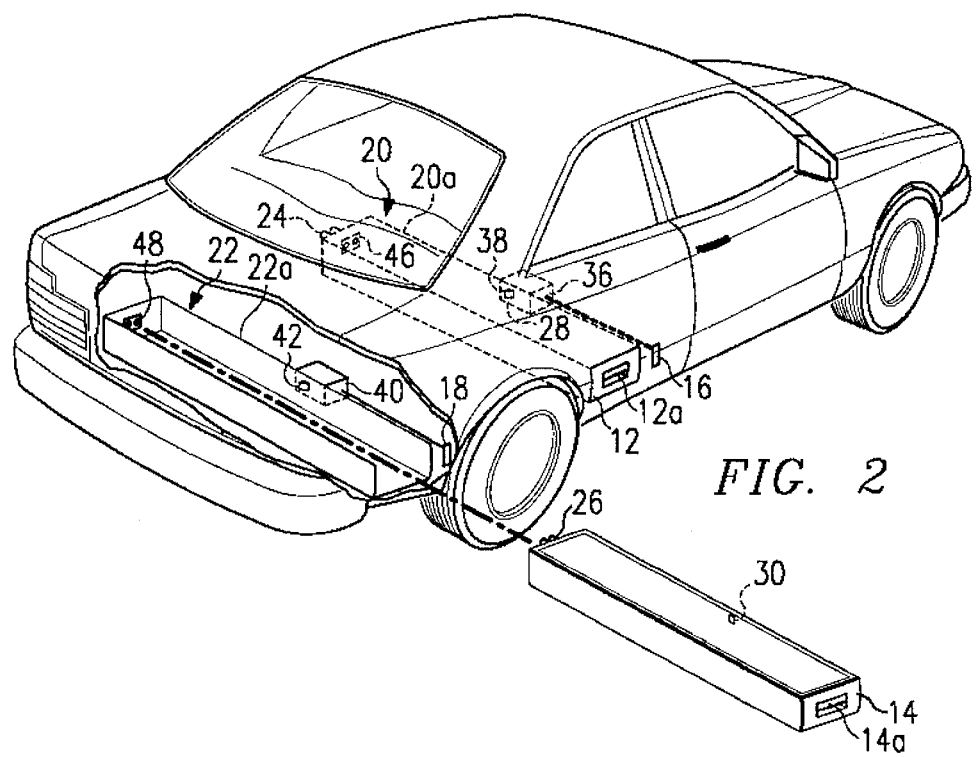
FIG. 2
| SEQUENCE | BATTERIES IN VEHICLE | BATTERY POWERING VEHICLE | BATTERY DISCHARGED |
|---|---|---|---|
| 1 | A B | A | |
| 2 | A B | B | A |
| 3 | C B | B | |
| 4 | C B | C | B |
| 5 | C D | C | |
FIG. 6

1

ELECTRIC VEHICLE HAVING MULTIPLE REPLACEMENT BATTERIES

This is a continuation of application Ser. No. 08/045,523 filed on Apr. 8, 1993, which issued as U.S. Pat. No. 5,373,910 on Dec. 20, 1994.

FIELD OF THE INVENTION

The present invention pertains in general to battery-powered vehicles, and in particular to such vehicles which have batteries that, when discharged, are replaced rather than recharged in the vehicle.

BACKGROUND OF THE INVENTION

Traditional electric vehicles have rechargeable batteries. When the battery is discharged, the vehicle is parked and a power cord is connected to the battery for recharging. Certain electric vehicles have been described and developed which remove the discharged batteries and replace them with charged batteries rather than waiting for recharging of the on-board batteries. Examples of such vehicles are shown in U.S. Pat. Nos. 3,336,997 to Yates et al., 4,087,895 to Etienne and 4,102,273 to Merkle et al.

Although battery-powered vehicles have many advantages, such as reduced pollution and low noise, the range and payload of battery-powered vehicles has been very limited. A typical battery-powered vehicle generally has a short range and can require many hours to recharge the batteries. In view of these limitations, there is a need for a new method of operating a battery-powered vehicle which maximizes the energy which is extracted from the batteries and does not require recharging of on-board batteries.

SUMMARY OF THE INVENTION

A selected embodiment of the present invention is a method of operation for a battery-powered vehicle which is propelled by an electric motor. A first battery provides electric power to the electric motor while the vehicle is carrying the first battery and is also carrying a second battery, which is not connected to provide electric power to the motor. When the electric power in the first battery has been substantially exhausted, the first battery is disconnected from the electric motor and the second battery is connected to provide electric power to the electric motor. The second battery provides electric power to the electric motor while the vehicle is carrying the first battery, after the first battery has been disconnected from the electric motor. After the first battery has been substantially exhausted of electric power, has been disconnected from the electric motor, and has been carried by said vehicle while the second battery has provided electric power to the electric motor, the first battery is removed from the vehicle and a third battery is installed in place of the first battery. Electric power is supplied from the second battery to power the electric motor while the vehicle is carrying the third battery, which is not connected to provide electric power to the electric motor. When the electric power in the second battery has been substantially exhausted, the second battery is disconnected from the electric motor and the third battery is connected to provide power to the electric motor.

The invention further provides features to make battery exchange easy and safe, to insure that the batteries are locked into their compartments, to easily release the batteries from a locked installation and to advise a vehicle operator and service person of when and which battery should be replaced.

DETAILED DESCRIPTION OF THE DRAWINGS

Figure 3:
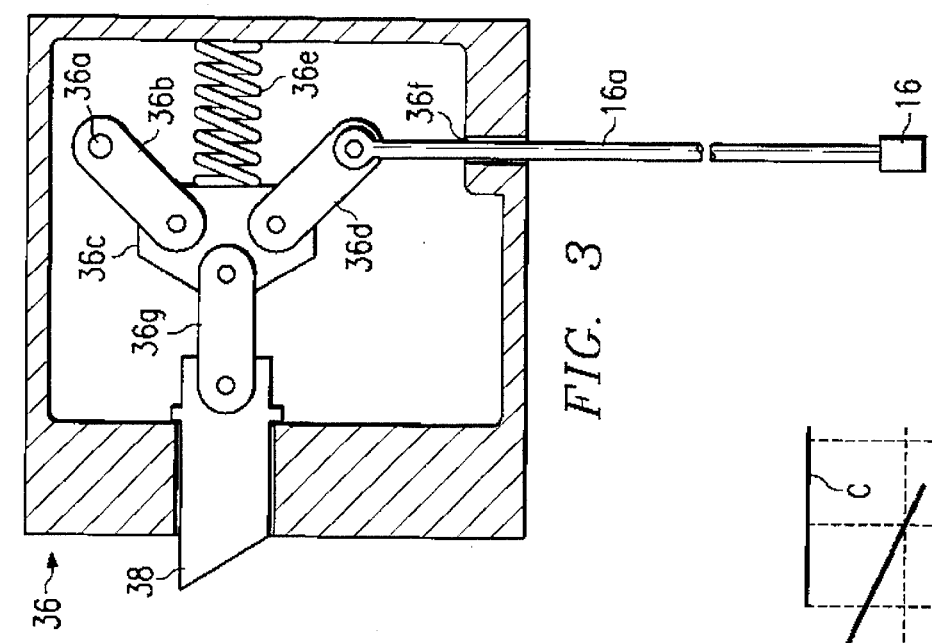
Figure 4:
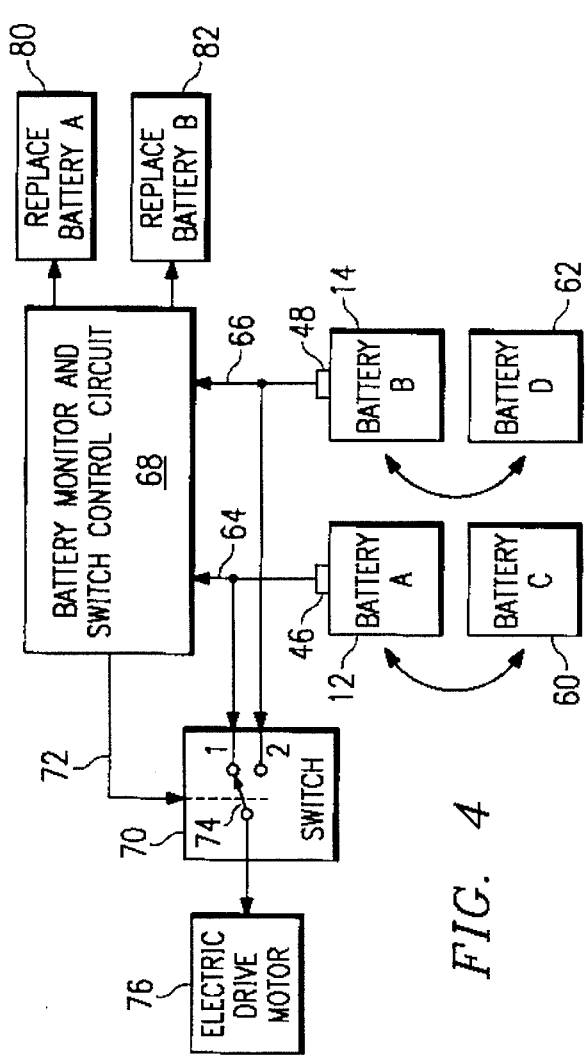
Figure 5:
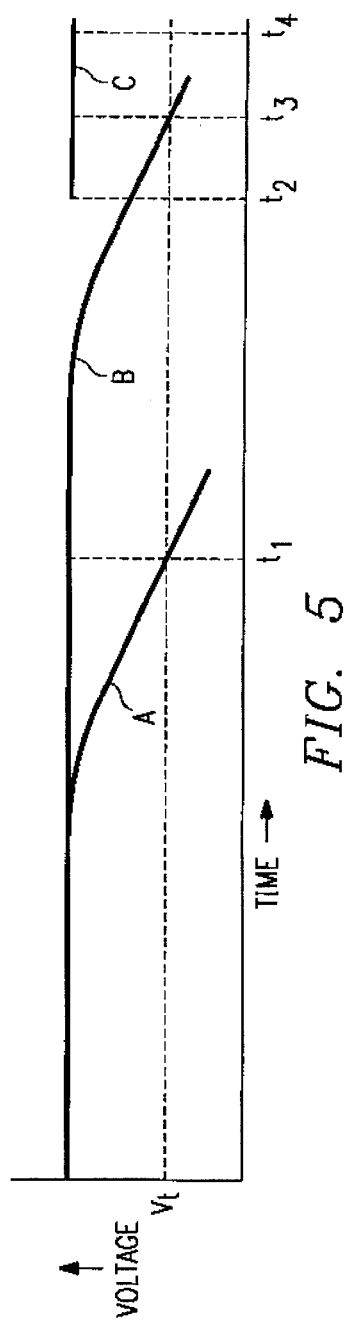

For a more complete understanding of the present invention and the advantages thereof, reference is now made to the following description taken in conjunction with the accompanying drawings in which:

FIG. 1 is an elevation view of a battery-powered vehicle which has two replacement batteries in accordance with the present invention, FIG. 2 is a partially cut-away, perspective view of the replacement batteries and battery holders of the vehicle shown in FIG. 1, FIG. 3 is a detailed view of the release mechanism shown in FIG. 2, FIG. 4 is a block diagram of the basic electrical operating units of the battery-powered vehicle shown in FIG. 1, FIG. 5 is a graph of battery voltages versus time for a group of the multiple replacement batteries used with the vehicle shown in FIG. 1, and FIG. 6 is a chart of sequential operational steps for using replacement batteries in the vehicle shown in FIG. 1, in accordance with the present invention.

DETAILED DESCRIPTION OF THE INVENTION

A battery-powered vehicle 10 is shown in FIG. 1. Vehicle 10 is provided with replaceable batteries 12 and 14, which are physically the same. A release handle 16 is provided to release battery 12, and a release handle 18 is provided to release battery 14. Batteries 12 and 14 are provided with respective handles 12a and 14a.

The batteries 12 and 14 are preferably of a type that has a high power density (kilowatt-hours per pound), as compared to lead-acid batteries, and as such typically are not rechargeable. A preferred example is a metal-air battery, and in particular, an aluminum-air battery. Batteries which may be used with the present invention are shown, for example, in the following U.S. Pat. Nos: 5,145,752; 5,114,802; 5,093,213; 5,049,457; 4,994,332; 4,988,581; 4,950,561; 4,925,744; 4,911,993; 4,828,939; 4,719,156; 4,687,714; 4,626,482; 4,490,443; 4,369,234; and 3,563,803. Each of these patents is hereby incorporated by reference. The batteries shown in these patents are primarily non-rechargeable. However, the present invention can also be used to advantage with rechargeable batteries, particularly ones that require a long or complex charging operation to achieve high density energy storage.

Referring to FIG. 2, there is shown in a cut-away view, two battery compartments 20 and 22 which are provided for respectively receiving the batteries 12 and 14. Battery 12 is shown in the installed position and battery 14 is shown in a position ready to be installed. A U-shaped (cross-section) support tray 20a is in compartment 20 and serves to support an installed battery, such as battery 12. Compartment 22 is provided with a similar tray 22a to support battery 14.

The battery 12 is provided with terminals 24 which transfer electrical power from the battery to a receptacle 46 in the compartment 20. Battery 12 also has on one side thereof a slot 28 that receives a detent 38 that extends from a locking mechanism 36. The release handle 16 is connected to the mechanism 36 so that the detent 38 is retracted when the handle 16 is pulled and extends when the handle 16 is released. The detent 38 locks the battery 12 in position when the battery is installed in the compartment 20 and insures that the terminals 24 are securely engaged to the receptacle 46.

The battery 14 is provided with terminals 26 which transfer electrical power from the battery to a receptacle 48 in the compartment 22. Battery 14 is provided with a slot 30 which is adapted to receive a detent 42 from a locking mechanism 40. The release handle 18 is connected to the mechanism 40 so that the detent 42 is retracted when the handle 18 is pulled and extends when the handle 18 is released. The detent 42 locks the battery 14 in position when the battery is installed in the compartment 22 and insures that the terminals 26 are securely engaged to the receptacle 48.

The mechanism 36 is shown in one embodiment in FIG. 3. The mechanism 36 includes a fixed pin 36a. A moving arm 36b is mounted to pin 36a and also to a pin on a plate 36c. The detent 38 is attached by a link 36g to the plate 36c. A moving arm 36d is connected between pins on the plate 36c and a rod 16a, which is connected to handle 16. A spring 36e is positioned to be in compression against the plate 36c. The rod 16a is positioned to travel in a guide shaft 36f. When the handle 16 is pulled, the plate 36c forces the spring 36e into greater compression and retracts the detent 38 to release an installed battery in compartment 20. When the handle 16 is released, the spring 36e forces the plate 36c and detent 38 outward so that the detent 38 can engage the slot 28 of battery 12 and thereby secure the battery 12 in the compartment 20. Also, the insertion of battery 12 can force detent 38 to move inward against spring 36e until the detent aligns and engages with slot 30. The mechanism 40 is the same as the mechanism 36.

A block diagram of operational electrical components is shown in FIG. 4. Batteries 12 and 14 are connected through the receptacles 46 and 48 and through respective lines 64 and 66 to a battery monitor and switch control circuit 68 and to respective terminals 1 and 2 of a switch 70. The control circuit 68 produces a control signal that is provided through a line 72 to operate a switch arm 74 of switch 70. The switch arm 74 is connected to provide electric power from one of the installed batteries to an electric drive motor 76. The switch 70 may be either mechanical or electronic.

The motor 76 propels the vehicle 10. Electric motor drive trains for battery-powered automobiles are well-known in the art.

Batteries 12 and 14 are labeled respectively as batteries A and B. Batteries 60 and 62 are labeled as C and D respectively and are structurally the same as batteries 12 and 14. The double-headed arrows indicate that battery 60 (C) can replace battery 12 (A) and likewise for batteries 62 (D) and 14 (B).

The control circuit 68 is connected to selectively operate warning lights 80 and 82 in conjunction with the operation of switch 70.

FIG. 5 shows battery voltage discharge curves for batteries A, B and C. The voltages are shown as a function of time. Events are marked for time points $t_1$, $t_2$, $t_3$ and $t_4$. A voltage threshold is shown as $V_t$ and this threshold represents a voltage level which indicates that a battery has been substantially exhausted of electric power. Quantities such as current, power or physical characteristics of the batteries may be monitored instead of voltage to determine when a battery is substantially exhausted of electric power.

FIG. 6 is a chart showing the operating sequence for use of replaceable batteries in accordance with the present invention.

Referring to the Figures, in operation, the vehicle 10 is provided with batteries 12 and 14 installed respectively in compartments 20 and 22. Battery 12 (A) is connected through switch 70 to provide power to motor 76. Switch arm 74 is in position 1. This corresponds to step 1 in FIG. 6. The vehicle 10 is operated with power from battery A until the voltage of this battery drops as indicated in FIG. 5. At time $t_1$, the voltage of battery A has dropped to $V_t$ and at this point, the control circuit 68 moves the switch arm 74 from position 1 to position 2 thereby disconnecting battery A from motor 76 and connecting battery B to motor 76. This corresponds to step 2 in FIG. 6. The vehicle 10 continues to be operated on battery B while carrying discharged battery A.

At a later time $t_2$, while the voltage of battery B is greater than $V_t$, battery A is removed from vehicle 10 and battery C is installed in compartment 20 to replace battery A. Vehicle 10 is then propelled by battery B while carrying battery C, which is not connected at this time to power the motor 76. This is represented by step 3 in FIG. 6.

The voltage of battery B drops to $V_t$ at time $t_3$, and at this time, the control circuit 68 operates the switch 70 to move the switch arm 74 back to position 1 thereby disconnecting battery B from motor 76 and connecting battery C to power the motor 76. This corresponds to step 4 in FIG. 6.

Finally, at time $t_4$, battery B is removed from compartment 22 and battery D is installed in compartment 22. This corresponds to step 5 in FIG. 6. The vehicle 10 continues to be powered by battery C while carrying battery D. Step 5 in FIG. 6 is virtually the same as step 1 and the process of battery usage and replacement is continued in sequence as described above.

The control circuit 68 activates the warning light 80 when the circuit 68 moves the switch arm 74 from position 1 to position 2 to inform the operator of the vehicle 10 that the battery in the forward compartment 20 should be replaced. The displayed warning is "REPLACE BATTERY A". The operator can reset the light when the battery is replaced. Likewise, the circuit 68 activates the warning light 82 when the switch arm 74 is moved from position 2 to position 1 to inform the vehicle operator that the battery in the rear compartment 22 should be replaced. The displayed warning is "REPLACE BATTERY B". The lights 80 and 82 are preferably located on the vehicle control panel in front of the operator. As an assistance to a service person, who replaces the batteries, duplicates of the lights 80 and 82 can be placed respectively near the handles 16 and 18 on the exterior of the vehicle 10 to make clear which battery should be replaced.

A preferable mode of battery recycling is that the non-rechargeable, discharged batteries, which have been removed from the vehicle 10, be remanufactured primarily using the components and materials in the discharged battery, to produce essentially new batteries—for future use in the vehicle.

The method of battery usage in accordance with the present invention insures that the maximum possible power is extracted from each battery used in a battery-powered vehicle.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What I claim is:

1. A battery system for a vehicle having an electric drive motor, comprising:

a first battery compartment within said vehicle, a second battery compartment within said vehicle, said second battery compartment having a similar size and configuration to said first battery compartment, a first battery connector proximate said first battery compartment, a second battery connector proximate said second battery compartment, a first battery located in said first battery compartment and having terminals thereof releasably connected to said first battery connector, a second battery located in said second battery compartment and having terminals thereof releasably connected to said second battery connector, said second battery having a size and configuration similar to said first battery, a switch electrically coupled to said first and second battery connectors and to said electric drive motor, a first opening in a panel of said vehicle adjacent said first battery compartment, a second opening in a panel of said vehicle adjacent said second battery compartment, a first battery release handle proximate said first opening and accessible from exterior of said vehicle for unlocking said first battery from said vehicle, and a second battery release handle proximate said second opening and accessible from exterior of said vehicle for unlocking said second battery from said vehicle.

2. A battery system for a vehicle having an electric drive motor, comprising:

a first battery compartment within said vehicle, a second battery compartment within said vehicle, said second battery compartment having a similar size and configuration to said first battery compartment, a first battery connector proximate said first battery compartment, a second battery connector proximate said second battery compartment, a first battery located in said first battery compartment and having terminals thereof releasably connected to said first battery connector, a second battery located in said second battery compartment and having terminals thereof releasably connected to said second battery connector, said second battery having a size and configuration similar to said first battery, a switch electrically coupled to said first and second battery connectors and to said electric drive motor, and a first opening in a panel of said vehicle adjacent said first battery compartment and a second opening in a panel of said vehicle adjacent said second battery compartment, wherein both of said openings are on a same side of said vehicle.

3. A battery system for a vehicle having an electric drive motor as recited in claim 2 wherein said first and second battery compartments are elongate.

4. A battery system for a vehicle having an electric drive motor as recited in claim 2 including:

a first battery locking mechanism proximate said first battery compartment, and a second battery locking mechanism proximate said second battery compartment.

5. A battery system for a vehicle having an electric drive motor comprising:

a first battery compartment within said vehicle, a second battery compartment within said vehicle, said second battery compartment having a similar size and configuration to said first battery compartment, a first battery connector proximate said first battery compartment, a second battery connector proximate said second battery compartment, a first battery located in said first battery compartment and having terminals thereof releasably connected to said first battery connector, a second battery located in said second battery compartment and having terminals thereof releasably connected to said second battery connector, said second battery having a size and configuration similar to said first battery, and a switch electrically coupled to said first and second battery connectors and to said electric drive motor, and, wherein said first and second battery compartments are elongate and the longitudinal axes of said first and second battery compartments are parallel to each other and are transverse to the longitudinal axis of said vehicle.

6. A battery system for a vehicle having an electric drive motor comprising:

a first battery compartment within said vehicle, a second battery compartment within said vehicle, said second battery compartment having a similar size and configuration to said first battery compartment, a second battery connector proximate said second battery compartment, a first battery located in said first battery compartment and having terminals located at a first end of said first battery, said first battery terminals releasably connected to said first battery connector, a second battery located in said second battery compartment and having terminals located at a first end of said second battery, said second battery terminals releasably connected to said second battery connector, said second battery having a size and configuration similar to said first battery, a switch electrically coupled to said first and second battery connectors and to said electric drive motor, and said first battery having a handle located at an end of said first battery opposite said first battery terminals, and said second battery having a handle located at an end of said second battery opposite said second battery terminals.

7. A battery system for a vehicle having an electric drive motor, comprising:

a first battery compartment within said vehicle, a second battery compartment within said vehicle, said second battery compartment having a similar size and configuration to said first battery compartment, a first opening extending through a body panel of said vehicle to said first battery compartment, a second opening extending through a body panel of said vehicle to said second battery compartment, a first battery connector proximate said first battery compartment, a second battery connector proximate said second battery compartment, a first replaceable battery located in said first battery compartment and having terminals thereof connected to said first battery connector, a second replaceable battery located in said second battery compartment and having terminals thereof connected to said second battery connector, said second replaceable battery having a size and configuration similar to said first replaceable battery, a switch electrically coupled to said first and second battery connectors and to said electric drive motor, and wherein said first and second battery compartments are parallel to each other and are transverse to the longitudinal axis of said vehicle.

8. A battery system for a vehicle having an electric drive motor as recited in claim 7 wherein said first and second battery compartments are elongate.

9. A battery system for a vehicle having an electric drive motor as recited in claim 7 including:

a first battery locking mechanism proximate said first battery compartment, and a second battery locking mechanism proximate said second battery compartment.

10. A battery system for a vehicle having an electric drive motor comprising:

a first battery compartment within said vehicle, a second battery compartment within said vehicle, said second battery compartment having a similar size and configuration to said first battery compartment, a first opening extending through a body panel of said vehicle to said first battery compartment, a second opening extending through a body panel of said vehicle to said second battery compartment, a first battery connector proximate said first battery compartment, a second battery connector proximate said second battery compartment, a first replaceable battery located in said first battery compartment and having terminals thereof connected to said first battery connector, a second replaceable battery located in said second battery compartment and having terminals thereof connected to said second battery connector, said second replaceable battery having a size and configuration similar to said first replaceable battery, a switch electrically coupled to said first and second battery connectors and to said electric drive motor, a first battery release handle proximate said first opening and accessible from exterior of said vehicle for unlocking said first battery from said vehicle, and a second battery release handle proximate said second opening and accessible from exterior of said vehicle for unlocking said second battery from said vehicle.

11. A battery system for a vehicle having an electric drive motor comprising:

a first battery compartment within said vehicle, a second battery compartment within said vehicle, said second battery compartment having a similar size and configuration to said first battery compartment, a first opening extending through a body panel of said vehicle to said first battery compartment, a second opening extending through a body panel of said vehicle to said second battery compartment, a first battery connector proximate said first battery compartment, a second battery connector proximate said second battery compartment, a first replaceable battery located in said first battery compartment and having terminals thereof connected to said first battery connector, a second replaceable battery located in said second battery compartment and having terminals thereof connected to said second battery connector, said second replaceable battery having a size and configuration similar to said first replaceable battery, a switch electrically coupled to said first and second battery connectors and to said electric drive motor, and wherein both of said openings are on a same side of said vehicle.

12. A battery system for a vehicle having an electric drive motor as recited in claim 7 wherein said first and second batteries are elongate.

13. A battery system for a vehicle having an electric drive motor comprising:

a first battery compartment within said vehicle, a second battery compartment within said vehicle, said second battery compartment having a similar size and configuration to said first battery compartment, a first opening extending through a body panel of said vehicle to said first battery compartment, a second opening extending through a body panel of said vehicle to said second battery compartment, a first battery connector proximate said first battery compartment, a second battery connector proximate said second battery compartment, a first replaceable battery located in said first battery compartment and having terminals located at a first end of said first replaceable battery, said first replaceable battery terminals connected to said first battery connector, a second replaceable battery located in said second battery compartment and having terminals located at a first end of said second replaceable battery, said second replaceable battery terminals connected to said second battery connector, said second replaceable battery having a size and configuration similar to said first replaceable battery, a switch electrically coupled to said first and second battery connectors and to said electric drive motor, and said first replaceable battery having a handle located at an end of said first replaceable battery opposite said first replaceable battery terminals, and said second replaceable battery having a handle located at an end of said second replaceable battery opposite said second replaceable battery terminals.

14. A battery system for a vehicle having an electric drive motor, comprising:

a first elongate battery compartment within said vehicle, a second elongate battery compartment within said vehicle, said second battery compartment having a similar size and configuration to said first battery compartment, a first opening extending through a body panel of said vehicle to said first battery compartment, said first opening substantially aligned with said first battery compartment, a second opening extending through a body panel of said vehicle to said second battery compartment, said second opening substantially aligned with said first battery compartment, a first battery connector proximate one end of said first battery compartment, a second battery connector proximate one end of said second battery compartment, and a first elongate replaceable battery located in said first battery compartment and having terminals thereof releasably connected to said first battery connector, a second elongate replaceable battery located in said second battery compartment and having terminals thereof releasably connected to said second battery connector, said second replaceable battery having a size and configuration similar to said first replaceable battery, a switch electrically coupled to said first and second battery connectors and to said electric drive motor, and wherein the longitudinal axes of said first and second battery compartments are parallel to each other and are transverse to the longitudinal axis of said vehicle.

15. A battery system for a vehicle having an electric drive motor as recited in claim 14 including:

a first battery locking mechanism proximate said first battery compartment, a second battery locking mechanism proximate said second battery compartment, a first battery release handle proximate said first opening, connected to said first battery locking mechanism and accessible from exterior of said vehicle, and a second battery release handle proximate said second opening, connected to said second battery locking mechanism and accessible from exterior of said vehicle.

16. A battery system for a vehicle having an electric drive motor, comprising:

a first elongate battery compartment within said vehicle, a second elongate battery compartment within said vehicle, said second battery compartment having a similar size and configuration to said first battery compartment, a first opening extending through a body panel of said vehicle to said first battery compartment, said first opening substantially aligned with said first battery compartment, a second opening extending through a body panel of said vehicle to said second battery compartment, said second opening substantially aligned with said first battery compartment, a first battery connector proximate one end of said first battery compartment, a second battery connector proximate one end of said second battery compartment, and a first elongate replaceable battery located in said first battery compartment and having terminals thereof releasably connected to said first battery connector, a second elongate replaceable battery located in said second battery compartment and having terminals thereof releasably connected to said second battery connector, said second replaceable battery having a size and configuration similar to said first replaceable battery, a switch electrically coupled to said first and second battery connectors and to said electric drive motor, and wherein both of said openings are on a same side of said vehicle.

* * * * *